United States Patent Office 3,012,070
Patented Dec. 5, 1961

3,012,070
NUCLEAR ALKYL 1,2-DIBENZOYLETHANE
SULFONATES
Leon W. Seigle, Westfield, N.J., assignor to Allied Chemical Corporation, a corporation of New York
No Drawing. Filed Dec. 4, 1957, Ser. No. 700,565
12 Claims. (Cl. 260—511)

This invention relates to a group of new organic sulfo compounds and to a process for the manufacture thereof. It relates more particularly to a group of novel 1,2-dibenzoylethane sulfonates in which one or both of the benzoyl radicals are substituted in the aromatic nucleus by alkyl groups, herein referred to briefly as nuclear alkyl 1,2-dibenzoylethane sulfonates.

An object of the present invention is to provide novel organic sulfo compounds which, in the form of the free sulfonic acids and their salts, possess combinations of desirable properties not usually found in known compounds of related types.

Other objects of the present invention are to provide novel organic sulfo compounds which in the form of the free sulfonic acids and their water soluble salts combine the desirable properties of outstanding wetting action in acid and neutral aqueous solution with relatively little foaming action, and to provide novel organic sulfo compounds which in the form of the free sulfonic acids and their alkali metal salts combine the desirable properties of outstanding wetting action in aqueous solution with stability to the action of acid hydrolyzing agents.

A further object of the present invention is to provide organic sulfo compounds which, in the form of the alkaline earth metal salts, are soluble in petroleum hydrocarbon lubricating oils and impart thereto desirable modifying action.

An additional object of the present invention is to provide organic sulfo compounds, having the foregoing desirable properties, which can be manufactured in a simple manner.

Other objects in part will be obvious and in part will appear from the following description of the invention.

Many wetting agents are known which are of the organic sulfonate type. One important group of them comprises compounds in which a sulfo-containing group is joined to one or more hydrophobic groups through one or more intermediate ester linkages. A wetting agent of this ester type is the sodium salt of di(2-ethylhexyl)sulfosuccinate. Such wetting agents have the drawback, however, that, being esters of carboxylic acids, they are subject to hydrolysis.

Many uses for which wetting agents are employed require the wetting agent to possess good stability to hydrolysis. For some uses, wetting agents are required which have high wetting power but very low foaming power.

According to the present invention, a novel group of nuclear alkyl 1,2-dibenzoylethane sulfonates is provided having the foregoing desirable properties; namely, the nuclear alkyl 1,2-dibenzoylethane sulfonates corresponding to the following general formula:

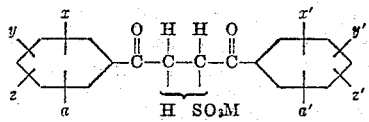

wherein
M represents a member selected from the group consisting of hydrogen and an alkali cation,
the bracket indicates that the sulfo group represented by —SO₃M may be on either carbon atom of the ethane radical,
$x$ represents an alkyl group,
$y$, $z$, $x'$, $y'$ and $z'$ represent hydrogen or an alkyl group,
$a$ and $a'$ represent hydrogen or chlorine,
and
The total number of carbon atoms in all of the substituent alkyl groups is 8 to 12 when both $y$ and $z$ are alkyl and 6 to 12 when at least one of $y$ and $z$ is hydrogen.

(As employed herein and in the claims the term "an alkali cation" denotes and includes the alkali metals, the alkaline earth metals, the ammonium radical and organic ammonium radicals.)

Compounds of this type wherein the above radicals

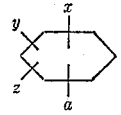

and

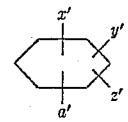

are identical or different are conveniently referred to hereinafter as symmetrical and unsymmetrical nuclear alkyl 1,2-dibenzoylethane sulfonates, respectively.

I have discovered that these novel nuclear alkyl 1,2-dibenzoylethane sulfonates as a group possess a combination of desirable properties which render them of exceptional value as surface-active agents. Thus, I have found that said nuclear alkyl 1,2-dibenzoylethane sulfonates in the form of the free sulfonic acids and water-soluble salts thereof (i.e. wherein M in the above formula is a cation imparting water-solubility), and especially their alkali metal and ammonium salts, are characterized by surprisingly high wetting power in dilute aqueous solutions in combination with relatively poor foaming power. (As employed herein and in the claims, the term "water-soluble" refers to a solubility in water of at least 0.1 gram per liter of water at 40° C.). This combination of properties is desirable in connection with many uses for which surface-active agents are employed.

Nuclear alkyl 1,2-dibenzoylethane sulfonates of the present invention having outstanding wetting properties are those symmetrical and unsymmetrical compounds in which the nuclear alkyl groups contain a total of 8 to 10 carbon atoms, especially the symmetrical 1,2-bis(monoalkylbenzoyl)ethane sulfonates, wherein the alkyl groups are butyl or amyl. I have discovered that the number of carbon atoms in the nuclear alkyl groups has a critical effect upon the properties of the nuclear alkyl 1,2-dibenzoylethane sulfonates. Thus, in the case of the symmetrical compounds, the wetting power of dilute aqueous solutions of the sodium salts passes through a maximum value when the total number of carbon atoms in the nuclear alkyl groups is 8 to 10. (In the case of symmetrical nuclear monoalkyl compounds having a total of less than 6 or more than 12 carbon atoms in the alkyl radicals and in the case of symmetrical nuclear polyalkyl compounds having a total of less than 8 or more than 12 carbon atoms in the alkyl radicals, the wetting power in aqueous solution of the sodium sulfonates is so low that the compounds are not of commercial value as wetting agents.)

The outstanding wetting action of the compounds of the present invention is illustrated by the following Table 1 showing a comparison of the wetting power of a number of nuclear alkyl 1,2-dibenzoylethane sulfonates of the present invention in the form of their sodium salts with the wetting power of other related sulfonates in aqueous solution at several concentrations. These data were determined by the "Canvas Tape Test Method" described in the American Dyestuff Reporter, Volume 39, No. 2 (1950), page 38. All determinations made were at 40°±1° C., using a 40 gram anchor, 1 gram hook and standard tapes, all of which were obtained from the U.S. Testing Company, Hoboken, New Jersey. The sulfonates are represented by the formula:

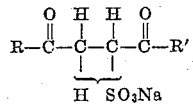

wherein R and R' represent alkylphenyl radicals.

The preparation of the sulfonates was carried out in the manner illustrated in the specific examples set out hereinafter.

TABLE 1

| R—C(=O)—C(H)(SO₃Na)—C(H)(H)—C(=O)—R' | | Wetting time in seconds at indicated concentration (grams/liter of water) | | | | |
|---|---|---|---|---|---|---|
| R | R' | 2 | 1 | 0.5 | 0.25 | 0.1 |
| n-propylphenyl | same as R | 4 | 21 | 67 | 225 | ---- |
| isopropylphenyl | ----do---- | 11 | 24 | 53 | 118 | 292 |
| n-butylphenyl | ----do---- | (¹) | 2.5 | 10 | 23 | 72 |
| n-butylphenyl (NH₄ salt) | ----do---- | 12 | 21 | 49 | 132 | 363 |
| sec. butylphenyl | ----do---- | (¹) | 8 | 21 | 51 | 187 |
| tert. butylphenyl | ----do---- | 2 | 7 | 24 | 63 | 270 |
| amylphenyl | ----do---- | <1 | 5 | 16 | 29 | 76 |
| hexylphenyl | ----do---- | (²) | (²) | 43 | 69 | 133 |
| diisopropylphenyl | ----do---- | 6 | 18 | 36 | 82 | 220 |
| p-tert. butyltolyl | ----do---- | 2 | 8 | 23 | 56 | 172 |
| triethylphenyl | ----do---- | 3 | 9 | 20 | 37 | 126 |
| octylphenyl | ----do---- | (²) | (²) | (²) | (²) | (²) |
| ethylphenyl | ----do---- | 155 | 408 | ---- | ---- | ---- |
| s-trimethylphenyl | ----do---- | 151 | 329 | ---- | ---- | ---- |
| diisopropylphenyl | phenyl | 4 | 16 | 31 | 68 | 181 |
| n-butylphenyl | amylphenyl | 16 | 26 | 49 | 87 | 232 |
| n-propylphenyl | ----do---- | 15 | 25 | 45 | 85 | 221 |
| octylphenyl | totyl | 47 | 73 | 133 | 226 | ---- |

¹ Instantaneous.
² Product not soluble to extent indicated.

The nuclear alkyl 1,2-dibenzoylethane sulfonates of the present invention are further characterized by outstanding resistance to the action of acid hydrolyzing agents, being organic compounds in which a sulfo group is directly linked to an alkyl carbon atom which in turn is linked to two hydrophobic radicals though a —C=O— bridge on one side and a —CH₂—C=O bridge on the other side. Thus they are stable in hot acid solutions. This is of considerable commercial importance in connection with the use of the compounds as wetting agents; as, for example, in acid dyeing processes, carbonization of wool, etc., where certain of the known wetting agents are of little utility owing to their lack of resistance to the hydrolyzing action of the hot acid.

In the form of the alkaline earth metal salts, the nuclear alkyl 1,2-dibenzoylethane sulfonates of the present invention impart desirable modifying characteristics to lubricating oils with which they are incorporated, and they are sufficiently soluble, especially in the form of the calcium and barium salts, to render them useful as additives for lubricating oils for internal combustion engines, and for metal cutting, boring and drawing operations.

The nuclear alkyl 1,2-dibenzoylethane sulfonates of the present invention can be readily prepared from the corresponding nuclear alkyl 1,4-diphenylbutene-1,4-diones by reaction of the latter with a bisulfite, and especially with the bisulfite of the cation of the desired sulfonate. Since the nuclear alkyl 1,4-diphenylbutene-1,4-diones can be readily obtained (for example, from the corresponding alkylbenzenes and alkyl chlorobenzenes by condensation with fumaryl chloride), a simple process is thus provided for the manufacture of wetting agents and other surface-active agents of outstanding properties from readily obtainable starting materials. The invention is not limited to said method of preparation, however, and other suitable methods can be employed.

In carrying out the manufacture of a sulfonate of the present invention in accordance with a preferred procedure, the corresponding nuclear alkyl 1,4-diphenylbutene-1,4-dione is reacted with an aqueous solution of a water-soluble bisulfite, preferably at or near the boiling point of the reaction mixture. For recovery of the sulfonate, the reaction mixture is extracted with a suitable solvent and the sulfonate is isolated from the resulting extract by removal of the solvent, for example by evaporation to dryness.

Since the alkali metal salts and especially the sodium salts of the nuclear alkyl 1,2-dibenzoylethane sulfonic acids are commercially the more desirable products, because of their relative cheapness and ease of preparation, the compounds are usually prepared in the form of the sodium or other alkali metal sulfonates. They may be prepared, however, in the form of the ammonium salt (or an organic ammonium salt) by the use of aqueous solutions of ammonium bisulfite or organic ammonium bisulfites, such as mono-, di-, tri- and tetramethylammonium bisulfites, ethyl-, benzyl-, cyclohexyl-, and mono-, di- and triethanolammonium bisulfites, morpholinium bisulfite, etc. The sulfonates can be prepared in the form of the free sulfonic acid, for example, by adding an aqueous solution of the sulfonate in the form of its sodium or other soluble salt dilute hydrochloric acid, whereby the relatively poorly soluble free sulfonic acid can be separated as an insoluble solid or oily product.

Alkaline earth metal salts of the nuclear alkyl 1,2-dibenzoylethane sulfonic acids can be prepared by treating the aqueous solution of the alkali metal or ammonium salt of the sulfonic acid with a water-soluble alkaline earth metal salt, and recovering the alkaline earth metal sulfonate by extraction with a solvent; or by reacting the free sulfonic acid with an alkaline earth metal oxide, hydroxide, or salt.

In carrying out the reaction of the nuclear alkyl 1,4-diphenylbutene-1,4-dione with an alkali metal bisulfite (or its equivalent meta-bisulfite), an excess of about 50% over the stoichiometric requirement of the bisulfite reagent is preferably employed, although it is possible to effect the sulfonation reaction with stoichiometric quantities of the reactants. Larger amounts of bisulfite than 2 mols per mol of the butenedione merely increase the amount of inorganic salt impurities introduced into the reaction mixture from which the sulfonate is recovered. The reaction can be accelerated considerably by including in the reaction mixture an organic solvent which is miscible with water but is relatively non-reactive with the bisulfite and with the butenedione. Ethyl alcohol, butyl alcohol, ethylene glycol and dioxane are representative of such solvents. Ethyl alcohol is preferred because of its ready availability and ease with which it can be removed from the product. A 50% aqueous ethyl alcohol solution constitutes an advantageous reaction medium.

When employing relatively pure reactants, the course of the reaction generally can be followed by the change in color of the reaction mixture; since the nuclear alkyl 1,4-diphenylbutene-1,4-diones are yellow to brown in color, whereas the dibenzoylethane sulfonates are substantially colorless to light yellow in color. Accordingly when substantially pure reactants are used, the reaction generally can be considered complete when the reaction mixture has become substantially colorless to pale yellow. Ordinarily, this requires about 1 to 3 hours, when the reaction is carried out at or near the boiling point of the reaction mixture. When the sulfonation reaction is carried out with the reactants of technical purity and especially with butenediones containing colored impurities (such as the crude mixtures of the type referred to hereinafter), it is generaly advisable to allow the reaction to continue for an extended period of time (for example, about 10 to 16 hours) to insure completion of the reaction, rather than to depend upon color changes.

The invention will be illustrated by the following specific examples, but it is to be understood that the invention is not limited to their details and that changes may be made without departing from its scope. The temperatures are in degrees centigrade and the parts and percentages are by weight, unless designated as parts by volume. Where parts are by volume, the amount signifies the volume occupied by the same number of parts by weight of water at 4° C. Sodium metabisulfite as employed therein was a commercial product containing at least 97.5% by weight of $Na_2S_2O_5$. Upon solution in water, it forms bisulfite.

*Example 1*

A mixture of 17.5 parts of 1,4-bis(n-butylphenyl)butene-1,4-dione (M.P. 95°–96°), 15 parts of sodium metabisulfite and 15 parts of water was heated for 1 hour at 95°. Thereafter 10 parts of water and 4 parts of denatured alcohol (Formula 2B) were added and the mixture was further heated at 95°. The color of the mixture changed from its original reddish orange to almost white, in about 20 minutes. After continuing the heating for an additional 40 minutes, 15.6 parts of the alcohol were added and the resultant solution was agitated for 1 hour. The resulting product was separated from inorganic salts by adding 195 parts of the alcohol, whereby the salts were precipitated, and filtering the hot slurry. The filtrate was evaporated to dryness. The light yellow residue was purified by crystallization from anhydrous alcohol followed by recrystallization from 20% aqueous alcohol. The sodium 1,2-bis(n-butylbenzoyl)ethane sulfonate thus obtained in the form of a white solid had a melting point of 202° to 204° and weighed 16 parts.

*Example 2*

A mixture of 17.5 parts of 1,4-bis(n-butylphenyl)butene-1,4-dione, 17 parts of a 45% aqueous solution of ammonium bisulfiate, 100 parts of water and 78 parts of the denatured alcohol was heated to boiling under a reflux condenser. After 40 minutes, an additional 17 parts of the aqueous ammonium bisulfite were added and refluxing was continued. The color of the mass almost immediately began to change from the original dark reddish-orange toward yellow. The mixture was refluxed for 3 hours and then 17 parts more of aqueous ammonium bisulfite were added. No further lightening of the color of the mass occurred, indicating that the reaction was completed. 156 parts of anhydrous alcohol were added, the mixture was filtered to remove inorganic salts, the filtrate was evaporated to dryness, and the residue was extracted with 156 parts of anhydrous alcohol. Upon evaporation of the extract, ammonium 1,2-bis(n-butylbenzoyl)ethane sulfonate was obtained in the form of a light orange oil, which did not crystallize on cooling. The yield was 25 parts.

*Example 3*

42 parts of 1,4-bis(amylphenyl)butene-1,4-dione (prepared by reacting amylbenzene having a boiling point of 86° to 88° at 25 to 25.5 mm. with fumaryl chloride and aluminum chloride in carbon disulfide) were heated at 100° with 10.6 parts of sodium metabisulfite and 10.6 parts of water for about 16 hours. The resulting light orange-brown mixture was purified by adding 150 parts of water and 5 parts of decolorizing charcoal ("Darco"), heating the mixture thus obtained to boiling, sludge filtering the hot mass, and evaporating the clarified filtrate to dryness. The resulting product contained sodium 1,2-bis(amylbenzoyl)ethane sulfonate together with inorganic salts and impurities. It was purified by extracting with petroleum ether, separating the extract of soluble material from the insoluble residue (comprising essentially inorganic salts) by filtration, and evaporating the filtrate. The sodium 1,2-bis(amylbenzoyl)ethane sulfonate thus obtained melted at 211° to 216.5° and weighed 46 parts, corresponding to 93% of the theoretical yield.

*Example 4*

A mixture of 40 parts of 1,4-bis(diisopropylphenyl)butene-1,4-dione (prepared by reacting diisoproplybenzene with fumaryl chloride and aluminum chloride in an aliphatic hydrocarbon solvent), 19 parts of sodium metabisulfite and about 25 parts of 50% aqueous denatured alcohol was refluxed for 15 hours. The mass was filtered hot and the filtrate was evaporated to dryness. Sodium 1,2-bis(diisopropylbenzoyl)ethane sulfonate was obtained in the form of a viscous oil which did not crystallize and which was substantially free of inorganic salts (no precipitate was obtained upon addition of anhydrous alcohol). The yield was 43 parts.

*Example 5*

A mixture of 40 parts of 1,4-bis(triethylphenyl)butene-1,4-dione (in the form of a crude yellow oil which was prepared by condensing triethylbenzene with fumaryl chloride and aluminum chloride in an aliphatic hydrocarbon solvent, treating the product with a mixture of hydrochloric acid and ice, washing the oil with water and removing the solvent by steam distillation), 14.2 parts of sodium metabisulfite, 100 parts of water and 15.5 parts of alcohol was heated under a reflux condenser at about 85° to 90° for 16 hours. No noticeable change in the dark red color of the reaction mixture occurred. Anhydrous alcohol (195 parts) was added to the reaction mass and the inorganic salts precipitated thereby were separated by filtration of the hot slurry. The filtrate was evaporated to dryness, the residue was extracted with 234 parts of hot anhydrous alcohol, and the extract was evaporated to dryness. Sodium 1,2-bis(triethylbenzoyl)ethanesulfonate was thus obtained as a reddish-brown residue which on cooling hardened to a brittle resin that formed a light brown powder when ground. The yield was 29 parts.

*Example 6*

*Part 1.*—A mixture of 75 parts (0.71 mol) of ethylbenzene and 95 parts (0.72 mol) of n-butylbenzene (B.P. 181–183°) was added during 1 hour to a mixture of fumaryl chloride and aluminum chloride in 1,2-dichloroethane prepared by introducing 107 parts (0.7 mol) of fumaryl chloride into a mixture of 433 parts of 1,2-dichloroethane and 208 parts (1.56 mol) of aluminum chloride during 1 hour while holding the temperature below 30°, stirring at 30–35° for a half hour, and cooling to 15°. The reaction mixture (which turned deep red shortly after start of the addition) was kept below 25° with cooling until the addition was complete, and then was stirred for 1 hour at 30°. The mass was then poured into a mixture of 35 parts of 20° Bé. hydrochloric acid and 2,000 parts of ice, the resulting diluted mass was agitated for one-half hour and then permitted to stratify, the oil layer was removed and washed 3 times with water, the 1,2-dichloroethane solvent in the oil layer was removed by steam distillation, and the residue was cooled (to solidify the red oil contained therein) and filtered. The filter cake thus obtained was dissolved in about 400 parts of a commercial technical heptane solvent ("Skellysolve B") and refluxed with return of the solvent condensate while withdrawing condensed water until all the water was removed by distillation. The residue was sludge filtered and cooled to 5°. Orange yellow crystals (M.P. 55–58°) which formed were filtered off. By recrystallization from methanol, light yellow crystals (M.P. 59–61°) were obtained. The product was a mixture of 1-n-butylphenyl-4-ethylphenylbutene-1,4-dione; 1,4 - bis(ethylphenyl)butene - 1,4 - dione and 1,4 - bis(n - butylphenyl)butene-1,4-dione.

*Part 2.*—The crude product obtained in Part 1 of this example was purified by "triangular recrystallization," as described in "Technique of Organic Chemistry," vol. III (1950), edited by Arnold Weissberger, Interscience Publishers, Inc., pages 424–6, employing methanol as the solvent and over 50 recrystallization steps. Along the left side of the triangle were obtained crystal crops increasingly richer in 1,4-bis(n-butylphenyl)butene-1,4 - dione; along the right side of the triangle were obtained crystal crops increasingly richer in 1,4-bis(ethylphenyl)butene-1,4-dione; and toward the middle of the triangle, crystal crops were obtained increasingly richer in the unsymmetrical 1-n-butylphenyl-4-ethylphenyl-butene-1,4 - dione. All crops of the latter crystals melting in the range 67–68° (obtained in the middle region of the above triangle) as well as their mother liquors were combined, concentrated by evaporation, and cooled to 0–5° to form a crystal crop which melted at 67–68°. The mother liquor was further concentrated and similarly cooled to yield another crop of crystals which melted at 66–67°. Both crops thus obtained were combined and recrystallized from methanol, yielding a product which melted at 67–68° and which was substantially pure 1-n-butylphenyl-4-ethylphenylbutene-1,4-dione (the melting point remained constant at 67–68° after each of four successive recrystallizations from methanol). For purposes of comparison, the following mixtures of the two corresponding symmetrical butenediones were prepared and their melting points were found to be as set out in the following Table 2.

TABLE 2

| 1,4-bis (n-butylphenyl)- butene-1,4- dione, Parts | 1,4-bis (ethylphenyl)- butene-1,4- dione, Parts | Melting Point, °C. |
|---|---|---|
| 100 | 0 | 97–8 |
| 75 | 25 | 81–6 |
| 50 | 50 | 79–81 |
| 25 | 75 | 91–98 |
| 0 | 100 | 114.5–115 |

Part 3.—A mixture of 5.36 parts of 1-n-butylphenyl-4-ethylphenyl-butene-1,4-dione (M.P. 67–68°) obtained in Part 2 of this example 5.36 parts of sodium metabisulfite, 25 parts of water and 25 parts by volume of the denatured alchohol was heated to boiling under a reflux condenser and boiled with agitation for 1 hour, during which the yellow color gradually disappeared and a complete solution ensued. The reaction mixture was cooled and then diluted with 200 parts by volume of the denatured alcohol, to precipitate inorganic salts which were separated by filtration. The filtrate was evaporated to dryness, yielding a residue constituting sodium 1-n-butylbenzoyl-2-ethylbenzoylethane sulfonate, corresponding to the general formula:

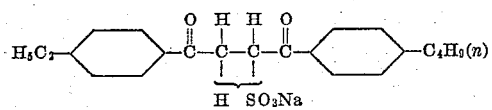

The wetting power of the sulfonate thus obtained, as determined by the above Canvas Tape Test method is shown in the following Table 3:

TABLE 3

| Concentration (Grams per Liter of Distilled Water) | Wetting Time in Seconds at 40°±1° C. |
|---|---|
| 2 | 3 |
| 1 | 13 |
| 0.5 | 40 |
| 0.25 | 154 |
| 0.1 | 800 |

When crystallized from about 10% aqueous denatured alcohol, the sulfonate possessed a melting point of 200–204°.

Example 7

A mixture of 10 parts of 1,4-bis(n-butylphenyl)-butene-1,4-dione, 7.8 parts by volume of aqueous monoethanolammonium bisulfite (containing 4.0 parts of monoethanolammonium bisulfite and obtained by passing $SO_2$ gas into aqueous monoethanolamine at 10–15°), and 50 parts by volume of denatured ethyl alcohol was heated to 50–70° for 18 hours. The alcohol was removed from the mixture thus obtained by evaporation by heating, leaving a brown oil which solidified on cooling. The crude product thus obtained was refluxed for 1 hour with about 50 times its weight of petroleum ether (boiling range 30–65°), and the resulting mixture was cooled to room temperature and filtered. The filter cake was dried at about 80° in an atmospheric oven. The resulting dry, grayish product was monoethanolammonium 1,2-bis(n-butylbenzoyl)ethanesulfonate. By analysis it was found to contain 6.6% sulfur and 3.0% nitrogen, which compares favorably with 6.52% sulfur and 2.85% nitrogen required theoretically. The yield was almost quantitative.

When tested by the Canvas Tape Method referred to above, the product thus obtained possessed a wetting time of 22 seconds at a concentration of 0.25 gm./liter of solution in distilled water. For purposes of comparison, the corresponding sodium 1,2-bis(n-butylbenzoyl)-ethanesulfonate was prepared from the same 1,4-bis(n-butylphenyl)butene-1,4-dione by reaction with sodium metabisulfite. When tested in this same manner it possessed a wetting time of 18 seconds.

Example 8

A mixture of 36 parts of 1-phenyl-4-diisopropylphenyl-butene-1,4-dione (in the form of a reddish-brown oil), 28 parts of sodium metabisulfite and 50 parts of 50% aqueous denatured alcohol were refluxed for 16 hours. Then 234 parts of anhydrous alcohol were added, and the mixture was heated to boiling and filtered to remove the precipitated inorganic salts. The filtrate was evaporated to dryness, leaving a red-brown residue which solidified on cooling. When ground it formed a light brown powder. Analysis showed it to contain an amount of sulfur corresponding to 1-benzoyl - 4 - diisopropylbenzoylethane sodium sulfonate.

The invention is not limited to the details of the foregoing description and it will be realized by those skilled in the art that changes can be made without departing from the scope of the invention. A number of changes have been indicated above; others will be obvious.

The nuclear alkyl 1,4-diphenylbutene-1,4-dione employed as starting material for the preparation of the sulfonates of the present invention can be prepared in various ways, a number of which are known. Thus, the 1,4-bis(n-butylphenyl)butene-1,4-dione employed in Examples 1 and 2 was prepared substantially in the manner set out in Journal fur praktische Chemie, vol. 151 (1938), pages 209 and 210.

The 1,4-bis(n-amylphenyl)butene-1,4-dione employed in Example 3 was prepared as follows.

Example 9

To a mixture of 44 parts of aluminum chloride and 250 parts of carbon disulfide, 63 parts of amylbenzene (B.P. 86° to 88° at 25 to 25.5 mm.) and 25 parts of fumaryl chloride were added dropwise during 50 minutes at 25° to 30°. The dark red-colored mixture was agitated for one hour at about 25°, after which it was drowned in a mixture of 500 parts of water, 500 parts of ice and 29 parts of 20° Bé. hydrochloric acid. The drowned mass was stirred for a half hour and then was permitted to stratify. The oil layer was separated from the aqueous layer, which was extracted three times (each with 70 parts of ether) and the oil layer and ether extracts were combined. After drying over calcium chloride and partially decolorizing by treatment with 15 parts of commercial decolorizing charcoal ("Darco"), the ether, carbon disulfide and unchanged amylbenzene were removed by steam distillation. The residue was agitated with a solution of 14 parts of sodium bicarbonate in 200 parts of water for about 16 hours and, after separating the oil phase from the aqueous phase, the oil was purified by dissolving it in 140 parts of ether, drying the ether solution over calcium chloride, and distilling off the ether. The resulting dark brown product was 1,4-bis(amylphenyl)butene-1,4-dione.

The unsymmetrical bis(alkylphenyl)butene-1,4-dione employed as starting material in Example 8 was prepared as follows:

*Example 10*

To a mixture of 375 parts of ethylenedichloride and 140 parts of aluminum chloride, 76.5 parts of fumaryl chloride were added during 15 to 20 minutes at below 40°. The reaction mass was agitated for a half hour, cooled to 20°, and to it a mixture of 43 parts of benzene and 81 parts of diisopropylbenzene (a mixture of dialkylbenzenes in which the alkyl groups were isopropyl groups) was added during one hour at 20° to 25°. The resultant mixture was warmed to 30° and agitated at said temperature for two hours, and then poured into a mixture of 1500 parts of ice and 58 parts of 20° Bé. hydrochloric acid. The resulting aqueous mixture was agitated for one-half hour, permitted to stratify, and the lower orangered oily layer was separated. The aqueous layer was extracted with two 160-part portions of carbon tetrachloride, the extracts being added to the separated oil. The combined oil was washed with two 500-part portions of water, then with 300 parts of 2% aqueous caustic soda, and finally with two 500-part portions of water. The solvents and unchanged benzene and diisopropylbenzene were removed from the washed oil by steam distillation, leaving a reddish-brown oil comprising 1-phenyl-4-diisopropylphenylbutene-1,4-dione.

In a similar manner, other unsymmetrical nuclear alkyl 1,4-diphenylbutene-1,4-diones can be prepared by reacting fumaryl chloride with an equimolecular mixture of an alkylenebenzene and benzene or a different alkylbenzene, in the presence of aluminum chloride.

It is a feature of the present invention that the use of nuclear alkyl 1,4-diphenylbutene-1,4-diones in the pure form is not required for the preparation of the sulfonates of the invention, but crude starting materials can be used. Thus, the butenediones used as starting materials in above Examples 4 and 5 were crude oily products obtained in the manner illustrated by the following example.

*Example 11*

To a cooled mixture of 168 parts of diisopropylbenzene, 140 parts of aluminum chloride and 145 parts of a petroleum distillate solvent and consisting of a mixture of hydrocarbons boiling between 85.5° and 100° ("Skellysolve C"), there were added 76.5 parts of fumaryl chloride during one hour while maintaining the temperature below 25°. The mixture was warmed to 30° and held at that temperature with stirring for 2 hours. The resulting dark-colored mass was poured into a mixture of 1500 parts of ice and 58 parts of 20° Bé. hydrochloric acid. After being agitated for one-half hour, the aqueous mixture was permitted to stratify. The upper, oily layer was separated and washed twice with water, and the solvent was removed by steam distillation. The residual yellow oil comprising 1,4-bis(diisopropylphenyl)butene-1,4-dione was used without further purification.

While in the foregoing examples, the sulfonates were separated from inorganic salts formed as by-products, it is not necessary to separate the inorganic salts for all uses of the sulfonates. Thus, the aqueous mixture resulting from the reaction of the diones and sodium bisulfite may be evaporated to dryness directly, without preliminary extraction with an organic solvent, whereby sulfonate products containing various amounts of inorganic salts, chiefly sodium bisulfite, are produced.

I claim:
1. A nuclear alkyl 1,2-dibenzoylethane compound corresponding to the following general formula:

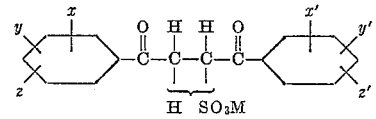

wherein M represents a member selected from the group consisting of hydrogen, the alkali metals, the alkaline earth metals, and the ammonium, monomethylammonium, dimethylammonium, trimethylammonium, tetramethylammonium, ethylammonium, benzylammonium, cyclohexylammonium, monoethanolammonium, diethanolammonium, triethanolammonium and morpholinium radicals, the bracket indicates that the —SO$_3$M group is linked to one of the carbon atoms of the ethane radical, $x$ represents an alkyl group, $y$, $z$, $x'$, $y'$ and $z'$ each represents a member selected from the group consisting of hydrogen and alkyl groups, the total number of alkyl carbon atoms in the molecule being 8 to 12 when both $y$ and $z$ are alkyl and 6 to 12 when at least one of $y$ and $z$ is hydrogen.

2. A nuclear alkyl 1,2-dibenzoylethane monosulfonate in the form of a salt of an alkali-forming metal which is free from further substituents and contains a single alkyl group as a substituent in each of the benzoyl nuclei, the total number of alkyl carbon atoms in the molecule being 6 to 12.

3. A symmetrical 1,2-bis(monoalkylbenzoyl)-ethane monosulfonate in the form of a salt of an alkali-forming metal wherein the alkyl groups each contain 3 to 6 carbon atoms.

4. 1,2-bis(monobutylbenzoyl)-ethane monosulfonate in the form of a salt of an alkali metal.

5. 1,2-bis(monoamylbenzoyl)ethane monosulfonate in the form of a salt of an alkali metal.

6. A symmetrical nuclear alkyl 1,2-dibenzoylethane monosulfonate in the form of a salt of an alkali-forming metal which is free from further substituents and contains a maximum of 2 alkyl substituents in each of the benzoyl nuclei, the total number of alkyl carbon atoms in the molecule being 6 to 12.

7. A symmetrical nuclear alkyl 1,2-dibenzoylethane monosulfonate which is free from further substituents and contains a methyl group and a butyl group as substituents in each of the benzoyl nuclei, in the form of a salt of an alkali metal.

8. A symmetrical nuclear alkyl 1,2-dibenzoylethane monosulfonate which is free from further substituents and contains a methyl group and a tertiary-butyl group as substituents in each of the benzoyl nuclei, in the form of a salt of an alkali metal.

9. A nuclear alkyl 1,2-dibenzoylethane, monosulfonate in the form of a salt of an alkali-forming metal which is free from further substituents and contains three alkyl groups as substituents in at least one of the benzoyl nuclei, the total number of alkyl carbon atoms in the molecule being 8 to 12.

10. Symmetrical 1,2-bis(trialkylbenzoyl)-ethane monosulfonate having the sulfo group in the form of a salt of an alkali-forming metal linked to one of the ethane carbon atoms and a total of 8 to 12 alkyl carbon atoms in the molecule.

11. 1,2-bis(triethylbenzoyl)-ethane monosulfonate having the sulfo group in the form of a salt of an alkali metal linked to one of the ethane carbon atoms.

12. A symmetrical nuclear alkyl 1,2-dibenzoyl-ethane monosulfonic acid which is free from further substituents and contains a maximum of 2 alkyl substituents in each of the benzoyl nuclei, the total number of alkyl carbon atoms in the molecule being 6 to 12.

References Cited in the file of this patent

Lutz et al.: J. Am. Chem. Soc. 57, 1953–7 (1935).

UNITED STATES PATENT OFFICE
CERTIFICATE OF CORRECTION

Patent No. 3,012,070            December 5, 1961

Leon W. Seigle

It is hereby certified that error appears in the above numbered patent requiring correction and that the said Letters Patent should read as corrected below.

Column 3, TABLE 1, the formula in the heading to the first column thereof, should appear as shown below instead of as in the patent:

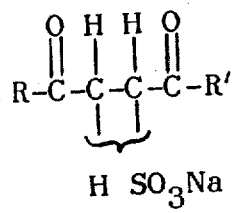

column 5, line 14, after "forms" insert -- sodium --; line 40, for "bisulfiate" read -- bisulfite --; column 9, line 25, for "into" read -- onto --; line 42, for "alkylenebenzene" read -- alkylbenzene --.

Signed and sealed this 14th day of August 1962.

(SEAL)
Attest:

ERNEST W. SWIDER

Attesting Officer

DAVID L. LADD

Commissioner of Patents